Nov. 19, 1940.　　W. F. DEHN ET AL　　2,222,254
TESTING APPARATUS
Filed April 7, 1939　　5 Sheets-Sheet 1
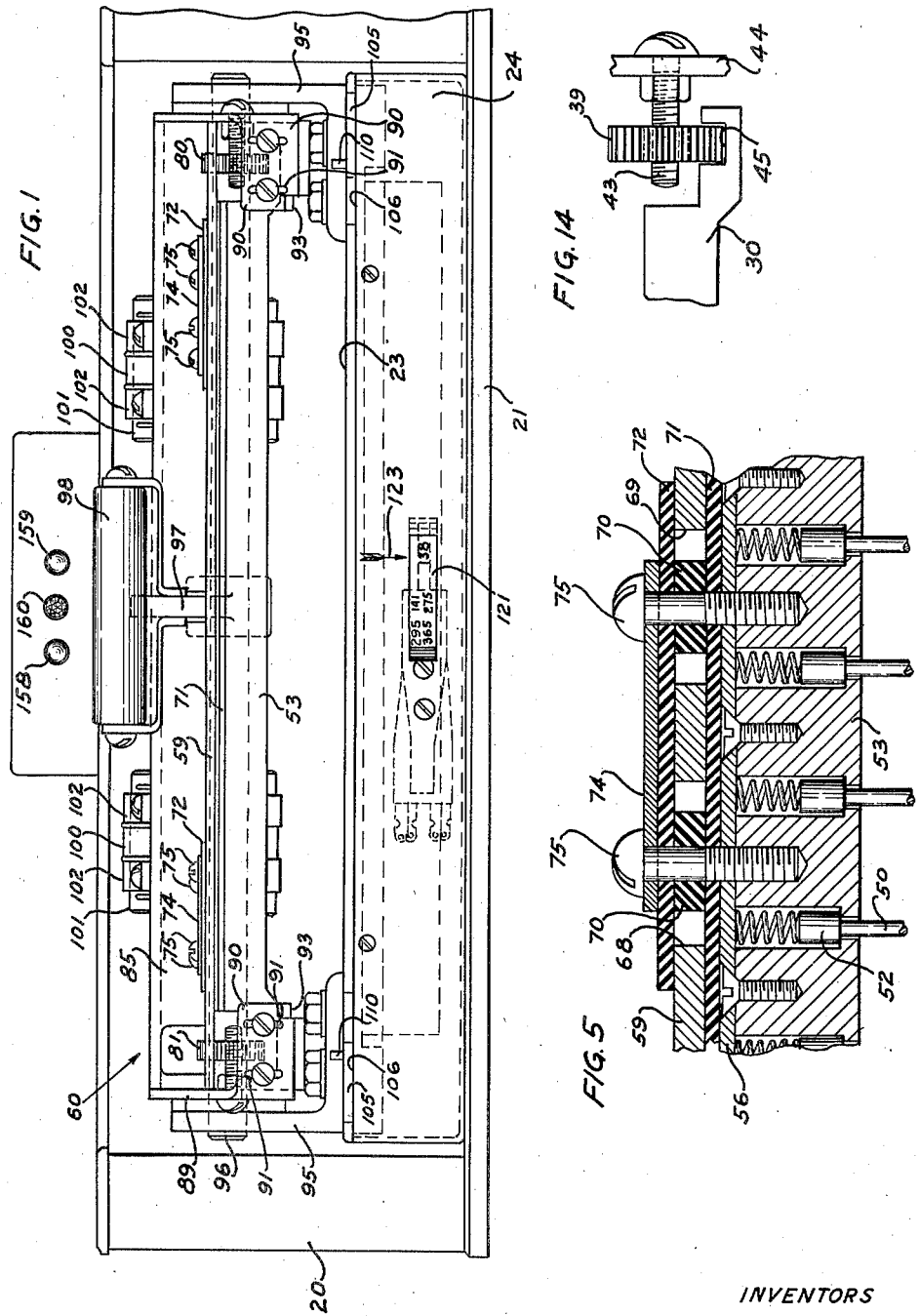
INVENTORS
W. F. DEHN
C. L. KARR
BY E. R. Nowlan
ATTORNEY

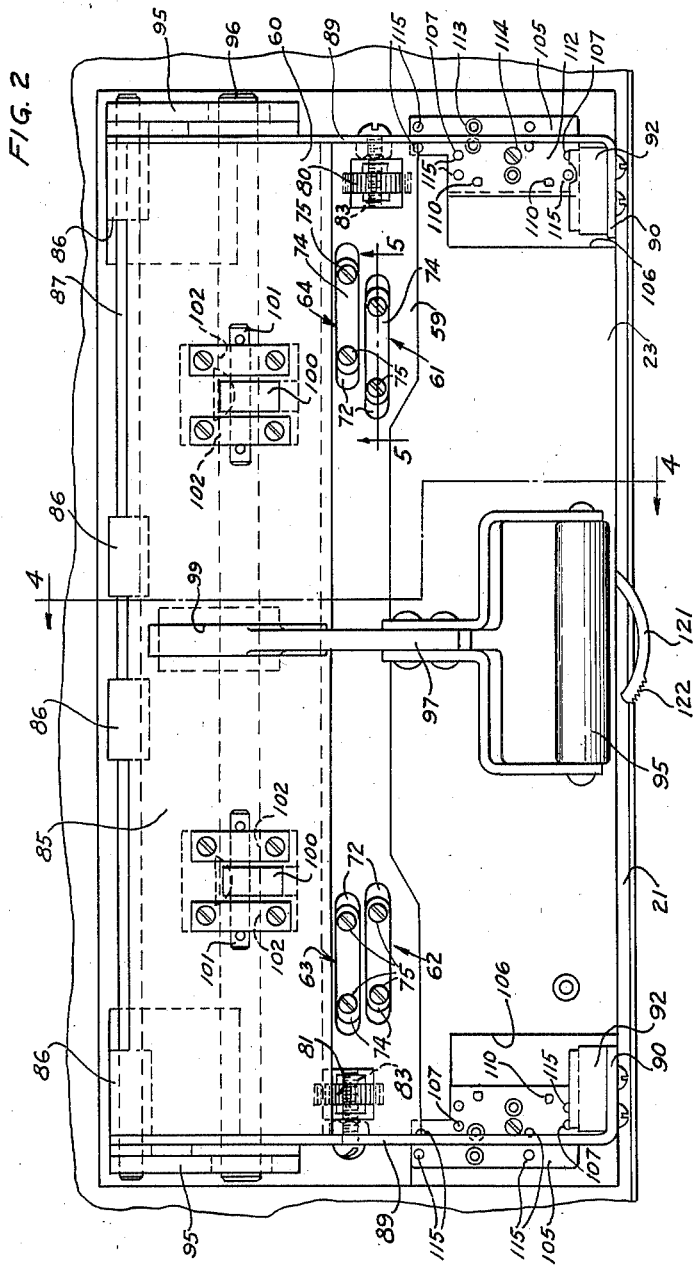

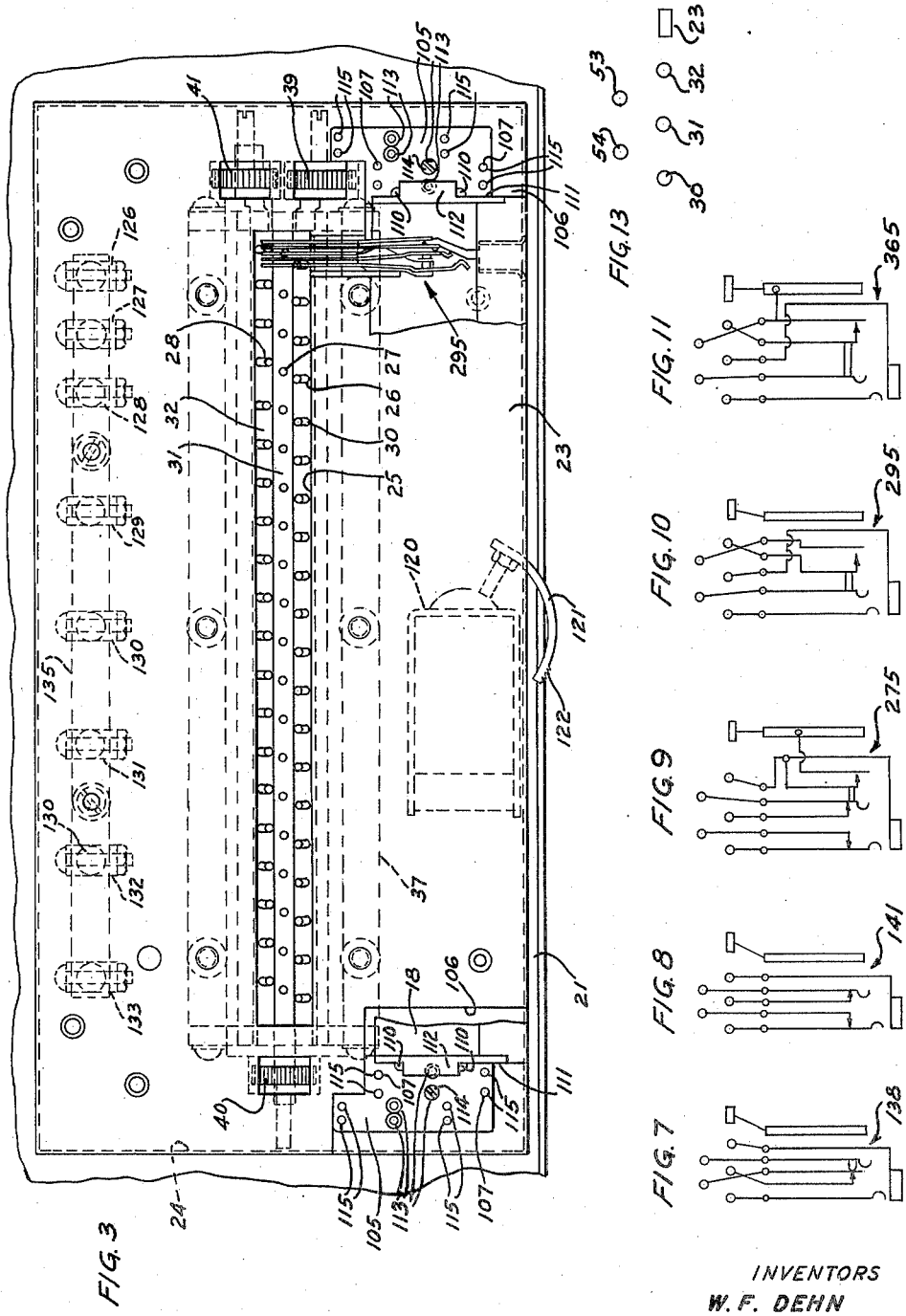

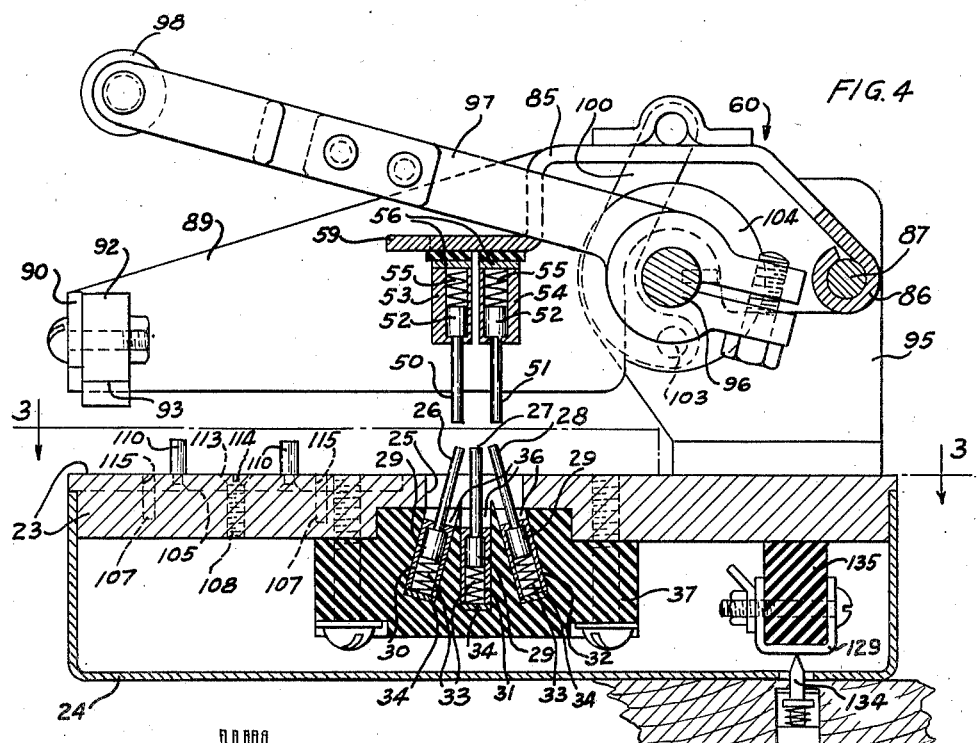
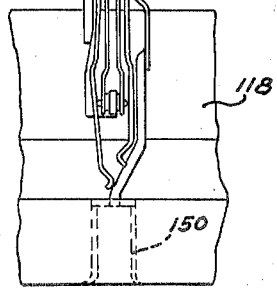
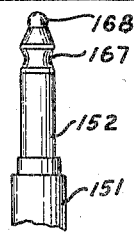

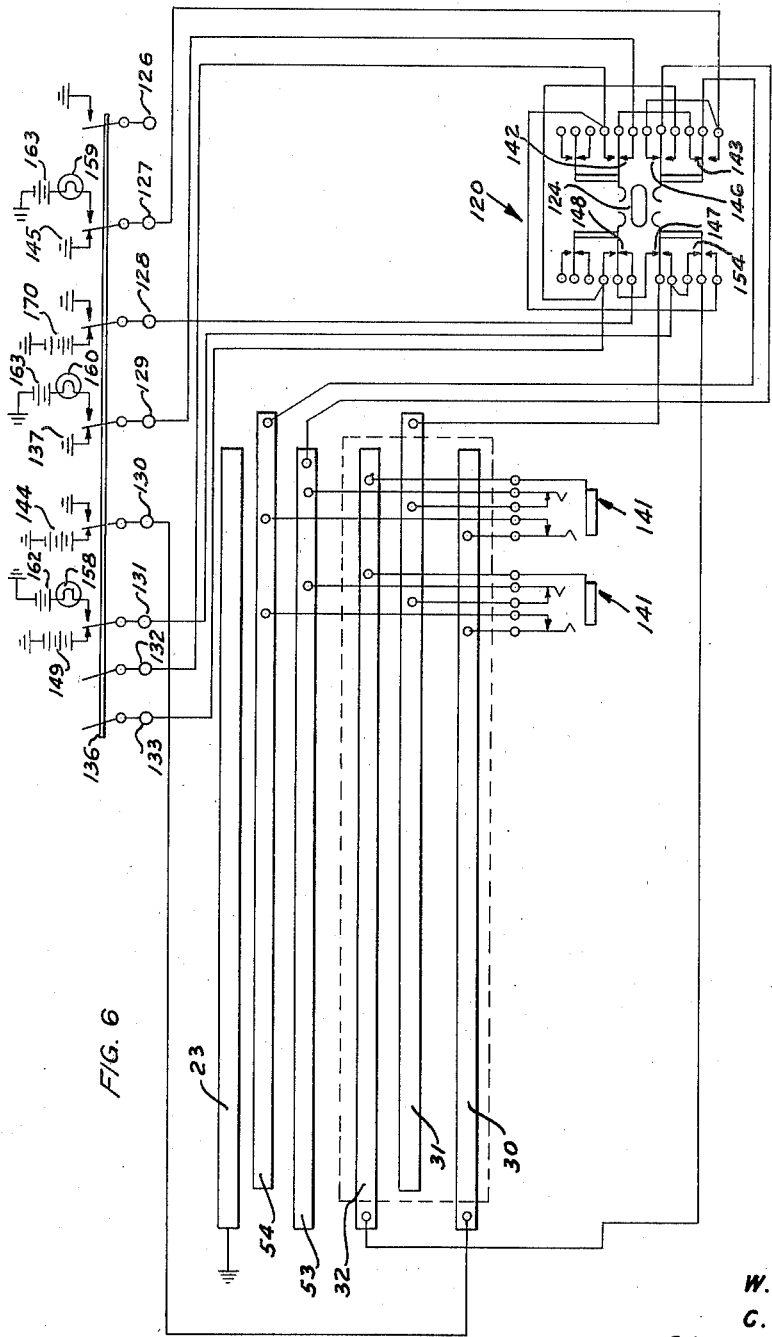

Patented Nov. 19, 1940

2,222,254

UNITED STATES PATENT OFFICE 2,222,254

TESTING APPARATUS

William F. Dehn, Nutley, and Chester L. Karr, Newark, N. J., assignors to Western Electric Company, Incorporated, New York, N. Y., a corporation of New York Application April 7, 1939, Serial No. 266,552

22 Claims. (Cl. 179—175.1)

This invention relates to testing apparatus, and more particularly to a universal apparatus for testing electrical units such as telephone jacks.

In the manufacture of telephone switchboard equipment there are various types of jacks used and various types of mounting strips for supporting the jacks in assembly. For example, there might be five different types of jacks and seven different types of mounting strips, each of the latter being designed to support each of the former, making thirty five combinations of assembled jacks and mounting strips known as jack strips. After these jack strips have been assembled, and prior to their installation in the switchboards, it is necessary that they be tested for assembly alignment of the jack springs and for possible defects in the insulation. To test the various jack strips the springs of each jack should be included in definite electrical circuits, and due to the fact that certain types of jack strips have ten jacks mounted thereon while others have twenty jacks mounted thereon, that certain of the mounting strips vary from others in size and that the arrangement of the springs in the different types of jacks varies one from another, in some instances separate testing apparatus for each type of jack strip have been provided in order to carry out these tests or to test the jacks individually.

An object of the invention is to provide a simple, efficient and practical apparatus universal in adjustment to test various types of electrical units, for example, jack strips.

With this and other objects in view, the invention comprises a support for various types of jack strips with adjustable locating members to position the springs of the jacks between sets of spring pressed contact pins, the latter being movably mounted in spaced apertures in metallic bars longitudinally movable to condition the apparatus to receive any type of jack strip and include the springs of the jacks thereof in electrical test circuits.

Other objects and advantages will be apparent from the following detailed description when taken in conjunction with the accompanying drawings, wherein Fig. 1 is a front elevational view of the apparatus;

Fig. 2 is a top plan view of the apparatus;

Fig. 3 is a fragmentary plan view taken substantially along the line 3—3 of Fig. 1;

Fig. 4 is a vertical sectional view taken substantially along the line 4—4 of Fig. 2;

Fig. 5 is an enlarged fragmentary sectional view taken along the line 5—5 of Fig. 2;

Fig. 6 is a wiring diagram illustrating the test circuits associated with bars supporting contact pins;

Figs. 7, 8, 9, 10 and 11 are schematic illustrations of different types of jacks;

Fig. 12 is a top plan view of one type of jack shown schematically in Fig. 8;

Fig. 13 is a schematic illustration of the position of the contact pins, and

Fig. 14 is an enlarged fragmentary view illustrating means to adjust the bars.

Referring now to the drawings, attention is directed to Fig. 1, which illustrates a housing 20 substantially U-shaped in general contour and mounted upon a base 21, the housing serving to support the switches of the test circuit hereinafter described and the various wires and terminals for the test circuit. The apparatus in general is mounted upon the base 21 and partially surrounded by the housing 20. This portion of the apparatus includes a table 23, which in a sense is a cover, for a metallic casing 24 conditioned to rest upon the base 21. Near the center of the table 23 a longitudinal groove or opening 25 is formed to permit the projection of rows of spaced contact pins 26, 27 and 28 therethrough. These pins have piston-like enlarged portions 29 at their lower ends which are movably disposed in apertures formed in metallic bars 30, 31 and 32, respectively. The upper surfaces of these bars have smaller apertures permitting free movement of their respective contact pins yet providing abutting shoulders to limit upward movement of the pins caused by compression springs 33 positioned beneath the enlarged portions 29 in the apertures of the bars where they are held against displacement by cover plates 34. The cover plates are secured to the bars by suitable means, such as flat head machine screws, positioned between the apertures in the bars.

The bars 30, 31 and 32 are slidably mounted in grooves 36 formed in an insulating block or support 37 disposed in the casing 24 and secured to the under side of the table 23. By viewing Fig. 4, it will be observed that the central groove, that is, the groove for the bar 31, extends perpendicular to the base 21, whereas the grooves upon each side thereof extend angularly with respect to each other and the vertical center line of the center groove, making it possible for the outer ends of the contact pins to be suitably positioned relative to the springs of the jacks, as will be hereinafter described.

Means is provided to adjust the bars 30, 31 and 32 so as to suitably locate their contact pins for engagement with jack springs depending upon the type of jack to be tested. The adjusting of these bars is brought about by the aid of knurled adjusting wheels 39, 40 and 41 disposed in the casing and accessible through apertures in the housing. The adjusting wheels are formed of suitable insulating material and have metallic internally threaded bushings fixedly mounted therein. Each adjusting wheel through its threaded bushings is mounted upon a stationary threaded element 43 rigidly supported by a bracket 44 carried by the table 23. Therefore, each adjusting wheel 39, 40 and 41 is threadedly connected to members 43 and by rotation of the adjusting wheels they will be moved either in one direction or the other. The bars 30, 31 and 32 are operatively connected to their respective adjusting wheels 39, 40 and 41 by grooves 45 positioned in their outer ends to permit their respective adjusting wheels to ride therein and cause longitudinal movement of the bars depending upon the axial movement of the adjusting wheels.

In each type of jack there are three springs positioned at one side, which may be termed the lower side, to be engaged by the contact pins 26, 27 and 28 and two springs positioned at the other or top side which are to be engaged by similar contact pins 50 and 51. These contact pins are identical in construction to the previously described contact pins 26, 27 and 28, having enlarged portions 52, piston-like in formation and movably disposed in spaced apertures in bars 53 and 54, respectively. The bars 53 and 54 are also substantially identical in construction to the bars 30, 31 and 32, they having compression springs 55, disposed in each aperture to urge the contact pins 50 and 51 downwardly, held in place by cover plates 56, through the aid of screws or the like, as illustrated in Fig. 5.

The bars 53 and 54 are supported by a horizontal metallic portion 59 of a movable clamping head 60. At four positions, indicated generally at 61, 62, 63 and 64, the bars 53 and 54 are slidably secured to the portion 59 of the clamping head 60. The connecting means at these positions are identical and a description of one will apply equally to all. Attention is, therefore, directed to Fig. 5, which is an enlarged sectional view taken at position 61. In this figure the portion 59 of the clamping head is shown provided with elongate apertures 68 and 69 spaced from each other in alignment and conditioned to receive annular members 70 formed of suitable insulating material. The annular members 70 rest upon an insulating strip 71 positioned between the cover plate 56 of the bar 53 and the portion 59 so as to insulate these portions from each other. A shorter strip 72, formed of suitable insulating material of sufficient rigidity and durability to support the bar 53 with its contact pins and associated members, is disposed upon the portion 59 and is of sufficient size to extend over and cover the apertures 68 and 69 regardless of the position of the bar. A metallic plate 74 placed upon the strip 72 completes the layer of elements for movably securing the bar 53 to the portion 59 with the aid of machine screws 75, or the like, extending through apertures in the plate 74, the strip 72, the annular members 70, the strip 71, cover plates 56, and into threaded apertures in the bar 53. This same structure is provided at each of the positions 61, 62, 63 and 64, movably securing the bars 53 and 54 to the portion 59 of the clamping head 60.

Means substantially identical in construction and operation to that previously described for the adjustment of the bars 30, 31 and 32 is provided for bars 53 and 54 to vary the positions of their contact pins depending upon the type of jack to be tested. This means consists of knurled wheels 80 and 81 accessible for operation through apertures in the portion 59 and provided with fixed internally threaded metallic bushings at their centers to interengage threads of members 83 fixedly mounted upon the clamping head 60. The wheels 80 and 81 are formed of suitable insulating material and ride in grooved projections of their respective bars 53 and 54 to cause longitudinal movement of the bars by movement of the adjusting wheels.

The clamping head 60 has a central portion 85 of the cross sectional contour illustrated in Fig. 4, having the portion 59 integral therewith and forming the front portion thereof while the back portion of the central member has circularly formed projections 86 for pivotally connecting the clamping head to a pivot rod 87. End members 89 positioned at each end of the central portion 85 and secured thereto in any suitable manner, or formed integral therewith, extend forwardly to positions adjacent the forward edge of the table 23, where they are bent inwardly at right angles, providing block supporting portions 90. The block supporting portions 90 have elongate apertures 91 disposed at spaced positions for the reception of screws or the like to adjustably secure clamping blocks 92 thereto. The clamping blocks 92 may be of any desired contour depending upon the dimensions of the jack strips to be tested, the clamping blocks shown having offset portions 93 to accommodate mounting strips varying in size.

Attention is again directed to Figs. 2 and 4, which show uprights 95 disposed at each end of the table 23 adjacent the rearward portion thereof to support the ends of the pivot rod 87. The uprights 95 also provide journals for the outer ends of a shaft 96 extending the full width of the table beneath the clamping head 60. Adjacent the center of the shaft 96 is fixedly mounted a hand lever 97 having a handle 98 disposed at the forward end thereof, the lever being free to move in a slot 99 in the central portion 85 of the clamping head. Positioned substantially midway between the lever 97 and each end of the shaft 96 are connecting links 100, the upper ends of which extend through apertures in the central portion of the clamping head, where they are pivotally connected thereto through the aid of pivot pins 101 connected to the central portion by suitable means, such as brackets 102. The inner or lower portions of the links 100 are bent arcuately to extend partially about the shaft 96, as illustrated in Fig. 4, and are pivotally connected, at 103, to eccentrics or disk members 104 fixedly mounted upon the shaft. By viewing Fig. 4 it will be observed that the lower edges of the ends 89 extend upwardly and partially around the shaft to allow suitable clearance for the movement of the clamping head into and out of clamping position.

Means is provided to locate various types of jack strips on the table 23 to definitely locate the springs of the jacks, of the type the apparatus is adjusted to receive, in engagement with definite contact pins. This means consists of locating elements 105 which are in the form of metallic plates of the general contours illustrated in Fig. 2. The table 23 is offset at the forward corners, as indicated at 106, so that the upper surfaces of the table 23 and elements 105 will lie in the same plane. In the table at the offset corners are disposed two pins 107 which extend upwardly distances equal to the thickness of the elements 105.

Threaded apertures 108 are also provided in the table midway between the respective pins 107 and in alignment therewith. Therefore, at each offset corner 106 of the table there are provided two spaced pins 107 and one threaded aperture positioned therebetween. The elements 105 have locating members 110, in the form of pins, projecting above the upper surfaces of the elements, as illustrated in Fig. 4, and having certain of their surfaces flattened to closely engage end walls 111 (Fig. 3) of contact strips and to receive therebetween locating portions 112 of the jack strips. Each element 105 has four apertures 113 disposed in the positions illustrated in Fig. 2 for receiving a screw 114, receivable also in the threaded aperture 108, for providing four different positions in which each element may be secured. Each element is also provided with four sets of apertures 115 in alignment with their respective screw receiving apertures 113 to receive the pins 107 in definitely locating the elements in the various positions. The elements are shown in Fig. 2 in what might be termed the No. 2 position, which position is the second from each end. To move the elements still further outwardly they will be positioned so that the screw 114 will be in innermost aperture 113 and the innermost aperture 115 will register with the pins 107. The other two positions result in locating the elements forwardly of the positions shown and closer together.

The testing electrical circuit of this embodiment of the invention is illustrated in Fig. 6. Here the bars 30, 31, 32, 53 and 54 are represented, which are intended, of course, to include their respective contact pins. The table 23 is also represented as having a ground potential and is to be included in certain of the circuits, particularly when associated with the metallic portion 118 of the jack strips, as illustrated in Fig. 2. A control switch, indicated generally at 120 in the diagram, is mounted in the casing 24 as shown in Figs. 1, 2 and 3. The switch 120 has three effective positions controlled through an arcuate projection 121 extending through an aperture in the front wall of the casing and having a serrated outer end 122 to assist in the actuation of the switch. An arrow 123 is disposed on the front wall of the casing, adjacent the aperture for the projection 121, to register with indications on the forward surface of the projection to indicate in which position the switch should be to test certain jacks. For the purpose of illustration, five different types of jacks are shown schematically in Figs. 7, 8, 9, 10 and 11, these jacks being indicated generally at 138, 141, 275, 295 and 365, respectively. Therefore, the indications, namely the numerals 138, 141, 275, 295 and 365, are disposed, in the present instance, on the projection 121 in the positions to indicate the location of the projection and switch to condition the test circuit for testing those paricular jacks.

Referring again to the wiring diagram, the actuating portion of the switch, which is connected to the projection 121 and controlled thereby, is indicated, at 124, in the central position, in which position the projection would be disposed so that the numerals 141 and 275 thereon would register with the arrow 123, indicating to the operator that the apparatus is in condition, so far as the electrical circuit is concerned, for testing jack springs carrying jacks 141 and 275. While the switch 120 is in this position bars 30, 31, 32, 53 and 54 are included in certain electrical circuits. The sources of electrical energy are connected electrically to terminals 126, 127, 128, 129, 130, 131, 132 and 133. These terminals are mounted upon an insulating strip 135 and are positioned to be engaged by spring pressed contacts 134 suitably mounted in the base 21 (Fig. 4). With the aid of suitable selective switches, such as the one indicated at 136 in Fig. 6 for the present illustration, selective electrical circuits may be connected to the terminals. For example, the selective switch 136 when in the position shown completes circuits for subjecting jacks 141 to a high voltage insulation breakdown test while movement in the other position introduces circuits for other tests described hereinafter. From the terminals 126 to 133 inclusive lead wires or conductors extend to the bars carrying the contact pins, as illustrated in the wiring diagram.

When the switch member 124 is in the central position and the switch 136 is at the left, as illustrated in Fig. 6, one circuit is completed from ground 137, through switch 136, terminal 129, break contacts 142 and 143 to the bar 54 representing one side of this circuit. The other side of this circuit may be traced from battery 144, through switch 136, terminal 130 to the bar 30. Therefore, an electrical connection of the bars 30 and 54 will complete the circuit. This is accomplished, for example, when testing a jack strip having jacks 141 mounted thereon. For the purpose of illustration, two jacks 141, schematically shown, are included in the wiring diagram. It will be observed that the ring springs of these jacks, that is, the first spring from the right in each jack, is electrically connected to the bar 30, this connection, of course, being made in actual practice through the contact pins 26 of the bar 30. The next spring to the left of the ring spring is called the ring back contact, this spring being connected to the bar 54 through one of the contact pins 51 thereof. In this test a breakdown voltage of, for example, five hundred volts, is applied to all of the jacks of the jack strip under test to determine whether or not there are any defects in the insulation at the various positions in the jack strip. The portions of insulation are mainly between the jack springs and at the sleeve. If the insulation is weak at any point the application of an electrical energy of high voltage to the different springs, which voltage is considerably higher than that which will be applied in actual practice, will cause a short in the circuit at such point which may be indicated through the aid of a suitable visible or audible signal (not shown) included in the various circuits. Another circuit completed through the jacks illustrated in the wiring diagram may be traced from ground 140, through switch 136, terminal 127 through the break contact 146, bar 53, through the second spring from the left known as the tip spring, through the central spring, which normally engages the tip spring, to the bar 31. From the bar 31 this circuit continues through break contacts 147 and 148, terminal 128, switch 136 and source of electrical energy, such as battery 170 to ground. The remaining circuit, to complete the insulation breakdown test of the type of jack illustrated in Fig. 6, may be traced from grounded battery 149, through switch 136, terminal 131, break contact 154 to bar 32. The bar 32 in this instance, through its contact pins, is electrically connected to the sleeve springs of the jacks, which springs are shown at the extreme left of each jack and are connected to the metallic tubular portions illustrated in Fig. 12, at 150, through which the switchboard plug, indicated at 151, passes and with which the sleeve 152 of the plug electrically engages.

No means is provided to complete this last mentioned circuit unless there is a breakdown in the insulation between the sleeve spring and the adjacent spring which would cause a short, completing the circuit through the adjacent spring, bar 53, break contact 146, terminal 127, switch 136 to ground 145.

Other electrical circuits may be electrically connected to the jacks to determine the presence of defects in the relative positioning of the springs. These circuits may be completed by moving the switch 136 to the right, opening the high voltage circuits and closing circuits through suitable indicating means, such as lamps 158, 159 and 160.

In the present instance the purpose of the lamp 158 is to indicate the correct positions of the sleeve spring shown in Fig. 12 as the spring leading from the tubular member 150 in the jack strip which will electrically engage the sleeve 152 of the plug. This spring is spaced from the metallic portion of the jack strip which rests upon the table 23 of the apparatus. If this spring is properly positioned away from the metallic portion of the jack strip no circuit will be completed through the lamp 158. However, if any of these springs should engage the metallic portion of the jack strip a circuit will be completed from a grounded battery 162 through lamp 158, switch 136, terminal 131, break contact 154, bar 32, sleeve spring, through the metallic portion of the jack strip, the table 23, to ground. Therefore, in this instance when the lamp 158 becomes illuminated the operator will know that there is a short in one or more of the sleeve springs.

The lamp 159 in this instance is conditioned to indicate the proper relation of the tip spring and the tip back spring, which springs are those second and third from the right of the jacks 141 shown in Fig. 6. These springs are normally in contact with each other, in which case a circuit should be completed from the grounded battery 163, through lamp 159, switch 136, terminal 127, break contact 146, bar 53, through the tip spring, the tip back spring, bar 31, break contacts 147 and 148, terminal 128, switch 136, to ground. To complete this test a master gage having a plurality of gage plugs receivable in the jacks may be inserted therein to test whether or not these circuits will be broken when the jack strip is in actual use. As a result of this test the circuit should be opened through the lamp 159 but if one or more of the sets of springs just described should not be properly positioned or fail to separate when the gage plug is inserted the circuit will be completed through the lamp 159 indicating such defect.

A similar circuit is also completed through the lamp 160 to test two remaining springs, that is, the ring spring and the ring back spring, which springs are those disposed at first and second positions from the right in Fig. 6. This circuit is completed from a grounded battery 163 through lamp 160, switch 136, terminal 129, break contact 142, break contact 143, bar 54, ring back spring, through the ring spring, bar 30, terminal 130, switch 136, to ground. The use of the suggested master tool with the gage plugs therein will open this circuit after all of the ring springs and ring back springs are properly positioned. However, if such is not the case and certain of these springs should continue to complete the circuit the lamp 160 will continue to be illuminated indicating such defect.

The switch 136 is merely suggestive and it should be understood that suitable switches may be provided to include the aforementioned circuits singly or in any desired group or groups.

Of the five different types of jacks illustrated in Figs. 7 to 11 inclusive, the type indicated at 141 has been illustrated in conjunction with the wiring diagram and is shown in Fig. 12 in actual structure. The titles given each spring of the jack depend upon their position relative to the three main portions of the plug 151 when disposed in connection with the jack. By viewing Fig. 12, it will be observed that the sleeve 152 thereof will electrically engage the tubular portion 150 when inserted in place, thus the spring of the jack connected to the tubular portion is called the sleeve spring. Furthermore, a portion of the plug called the ring, indicated at 167, will engage the ring spring, which is the first spring from the right. The second spring from the right is called the ring back spring, as it is back of and electrically engages the ring spring. The next spring, that is, the third spring from the right, is called the tip back spring because it is back of and electrically engages the tip spring, the latter engaging the tip 168 of the plug.

Attention is now directed to Fig. 13, which illustrates six means of completing electrical circuits through the springs of the various jacks, these means being the bars 30, 31, 32, 53 and 54 and the table 23. With Fig. 13 in view, attention is directed to Figs. 7 to 11 inclusive, which illustrate the different types of jacks, the arrangement of the bars and table shown in Fig. 13 and the manner in which the springs of the jacks are connected to the bars in the test circuit. It will be observed that the jack 138 is connected to the bars in a manner different from all the other types of jacks, while the jacks 141 and 275 are each connected in the same manner and jacks 295 and 365 are each connected in the same manner. Therefore, it is necessary to change the circuits to compensate for these differences in the positioning of the jack springs and their association with the bars. This is accomplished through the switch 120.

In conditioning the apparatus for operation upon one certain type of jack strip the operator first determines the type of jack present on the strip and if jack 138 should be present the switch 120 will be in the position shown in Fig. 1. However, if the jack should be 141 or 275 the switch will be moved to the position so that these members will register with the arrow 123 and in a like manner the switch will be moved to the innermost position so that the numerals 295 and 365 will register with the arrow should the jacks be 295 or 365. After the switch 120 has been adjusted to the proper position it is then necessary to determine the type of mounting included in the jack strip and adjust the locating elements 105 so that the jack strip will be properly located on the table, with the protruding ends of the jack springs positioned between the sets of contact pins. However, prior to the clamping of the jack strip in place the various bars 30, 31, 32, 53 and 54 are adjusted through the aid of their respective adjusting wheels to locate their contact pins so that they will engage the proper springs of the jacks. The apparatus is then conditioned to repeatedly subject jack strips of the particular type chosen by first locating a jack strip on the table between the sets of locating members 110, where certain of the protruding ends of the jack springs will rest upon the contact pins 26, 27 and 28. The operator may then move the clamping head downwardly to firmly hold the jack strip against displacement and to move the contact pins 50 and 51 into registration with their respective jack springs, the helical springs back of each contact pin assuring sufficient pressure to complete the electrical engagement between the contact pins and the springs of the jacks. The movement of the clamping head is brought about through the actuation of the hand lever 97 downwardly or counterclockwise (viewing Fig. 4). This movement of the hand lever through the aid of the eccentric connection of the links 100 to the shaft 96 will cause movement of the clamping head about its pivot 87 into the position shown in Fig. 4, where the pivots 103 are moved slightly beyond dead center with respect to the shaft 96 and the pivotal connection 101 of the other links, thus locking the clamping head in close position. While in this position the jacks and their respective springs may be subjected to the various tests previously described and if there should be any defect present it might be corrected by the operator, such as the positioning of certain springs correctly. This may be done wtihout removing the jack strip from the apparatus and due to the fact that the major portions of the jacks are opened to view after a test has been completed upon one jack strip the clamping head may be opened by moving the lever 97 upwardly or clockwise, viewing Fig. 4, causing the eccentrically mounted links 100 to move the clamping head about its pivot 87.

With this apparatus it is possible, by adjustment of the locating plates or elements 105, to definitely locate various types of electrical units, such as jack strips, so that the terminals of the units will engage definite contacts. The contacts, that is, those caried by the table as well as those carried by the head, may be adjusted depending upon the particular type of electrical unit to be tested so that each contact will engage a definite terminal when the head is in closed position. Furthermore, the positioning of the head in closed position locks the electrical unit under test against displacement so that the operator may carry out the various tests on the unit. The switch 120 conditions various electrical circuits, as illustrated in Fig. 6, for the testing of the various types of electrical units, which variations are necessary in order that the apparatus may test the numerous types of jack strips. The function of the switch 120 has been described in conjunction with the testing of one type of jack strip, using jacks 141. This illustration is believed sufficient with the disclosure in Fig. 6 to illustrate the possibility of conditioning the circuits through the movement of the switch 120 into the three different positions to condition the circuits to test other types of jack strips. Furthermore, the completion of the circuits through the switch 136 is illustrative only for this one type of jack strip and it is apparent that by the use of other selective switches the same test may be performed on other types of electrical units, such as jack strips.

The embodiment of the invention herein disclosed is illustrative only and may be widely modified and departed from in many ways without departing from the spirit and scope of the invention as pointed out in and limited only by the appended claims.

What is claimed is:

1. A testing apparatus for testing various types of jack strips including jacks with jack springs insulated from each other, the said apparatus comprising electrical test circuits, contacts included in the circuits, and means conditioned for adjustment to locate various types of jack strips so that the jack springs thereof may be engaged by the contacts.

2. A testing apparatus for testing various types of jack strips including jacks with jack springs insulated from each other, the said apparatus comprising electrical test circuits, contacts included in the circuits, and means conditioned for adjustment to locate definite jack springs of various types of jack strips in positions to be engaged by definite contacts.

3. A testing apparatus for testing various types of jack strips including jacks with jack springs insulated from each other, the said apparatus comprising electrical test circuits, contacts included in the circuits, means to vary the relative positions of the contacts for engagement with jack springs of various types of jack strips, and means to locate the jack strips for engagement of the jack strips with the contacts.

4. A testing apparatus for testing various types of jack strips including jacks with jack springs insulated from each other, the said apparatus comprising electrical test circuits, and means variable to position jack springs of any one of various types of jack strips in the circuits.

5. A testing apparatus for testing various types of jack strips including jacks with jack springs insulated from each other, the said apparatus comprising electrical test circuits, means to condition the circuits for different types of jack strips, and means variable to position jack springs of any one of various types of jack strips in the circuits.

6. A testing apparatus for testing various types of jack strips including jacks with jack springs insulated from each other, the said apparatus comprising electrical test circuits, means variable to position jack springs of any one of various types of jack strips in the circuits, and gripping members to hold the jack strips against displacement.

7. A testing apparatus for testing various types of jack strips including jacks with jack springs insulated from each other, the said apparatus comprising electrical test circuits, means variable to position jack springs of any one of various types of jack strips in the circuits, gripping members to hold the jack strips against displacement, and means to lock the gripping members in holding position.

8. A testing apparatus for testing electrical units having spaced conductive members, the said apparatus comprising sets of contacts, a movable support for each set of contacts, and means to cause relative movement of the supports to position the contacts for engagement with conductive members of electrical units.

9. A testing apparatus comprising a table, a contact positioned for movement relative thereto, a head member mounted for movement toward or away from the table, a contact movably carried by the head member, separate means to move the contacts relative to the head member to condition them for engagement with terminals of an electrical unit disposed upon the table, and means to cause movement of the head member to cause electrical engagement of the contacts with the terminals.

10. A testing apparatus comprising a table, means to locate an electrical unit having terminals on the table, a contact, means to move the contact relative to the table for engagement with certain of the terminals, a head member mounted for movement toward or away from the table, a contact movable with the head, means to adjust the last mentioned contact for engagement with certain of the terminals, and means to cause movement of the head member to cause electrical engagement of the contacts with the terminals.

11. A testing apparatus comprising a table, a contact positioned for movement relative thereto, a head member mounted for movement toward or away from the table, a contact movably carried by the head member, separate means to move the contacts to condition them for engagement with terminals of an electrical unit supported by the table, means to cause movement of the head member to cause electrical engagement of the contacts with the terminals, and means movable with the head to hold the electrical unit against displacement on the table.

12. A testing apparatus comprising electrical contacts, means to locate various types of electrical units having terminals for engagement of the terminals with the contacts, and separate means to cause variation in the relative positions of the contacts to condition the contacts to engage the terminals of any of the various types of electrical units.

13. A testing apparatus comprising electrical contacts, means to locate various types of electrical units having terminals for engagement of the terminals with the contacts, separate means to cause variation in the relative positions of the contacts to condition the contacts to engage the terminals of any of the various types of electrical units, electrical circuits, and means to condition certain of the circuits for electrical connection with the contacts.

14. A testing apparatus comprising electrical contacts, variable means to locate various types of electrical units having terminals for engagement of the terminals with the contacts, and separate means to cause variation in the relative positions of the contacts to condition the contacts to engage the terminals of any of the various types of electrical units.

15. A testing apparatus comprising electrical contacts, means to locate various types of electrical units having terminals for engagement of the terminals with the contacts, separate means to cause variation in the relative positions of the contacts to condition the contacts to engage the terminals of any of the various types of electrical units, electrical circuits, and selective means to condition the contacts to be included in varying groups of the circuits for the various types of electrical units.

16. A testing apparatus comprising a support for various types of electrical units having definitely spaced electrical elements with terminals, groups of definitely spaced contacts, a member for supporting each group of contacts, and means to cause adjustment of each member to selectively position each group of contacts for engagement with selected terminals of the said elements of the various types of units.

17. A testing apparatus comprising a support for electrical units having definitely spaced electrical elements with terminals, groups of definitely spaced contacts, a member for supporting each group of contacts, and means to cause adjustment of each member to selectively position each group of contacts for engagement with selected terminals of the said elements.

18. A testing apparatus comprising a support for various types of electrical units having definitely spaced electrical elements with terminals, groups of definitely spaced contacts, a member for supporting each group of contacts, means to cause adjustment of each member to selectively position each group of contacts for engagement with selected terminals of the said elements of the various types of units, electrical circuits, and selective means to condition the members and their respective contacts to be included in varying groups of the circuits for the various types of electrical units.

19. A testing apparatus comprising a table, a plurality of spaced contacts, a member to support the contacts, means to support the member for movement relative to the table, means to locate an elecrical unit having spaced terminals on the table relative to the contacts, and means to adjust the member to position the contacts for engagement with certain of the terminals.

20. A testing apparatus comprising a table, a plurality of spaced contacts, a member to support the contacts, means to support the member for movement relative to the table, means to locate an electrical unit having spaced terminals on the table relative to the contacts, means to adjust the member to position the contacts for engagement with certain of the terminals, a movable head, a plurality of spaced contacts carried by a member supported for movement with the head, and means to adjust the last mentioned member relative to the head to position the contacts carried thereby for engagement with certain of the terminals.

21. A testing apparatus comprising a table, a plurality of spaced contacts, a member to support the contacts, means to support the member for movement relative to the table, means to locate an electrical unit having spaced terminals on the table relative to the contacts, means to adjust the member to position the contacts for engagement with certain of the terminals, a movable head, a plurality of spaced contacts carried by a member supported for movement with the head, means to adjust the last mentioned member relative to the head to position the contacts carried thereby for engagement with certain of the terminals, and means to cause movement of the head to hold the unit against movement and to move the contacts carried thereby into engagement with their respective terminals.

22. A testing apparatus for testing various types of jack strips including jack springs insulated from each other, the said apparatus comprising electrical test circuits, means variable to locate any one of various types of jack strips in definite positions, and means variable to include the jack springs of any one of the various jack strips in certain of the electrical circuits depending upon the jack strip selected.

WILLIAM F. DEHN.
CHESTER L. KARR.